US00RE35900E

United States Patent [19]

Meissner

[11] E Patent Number: Re. 35,900

[45] Reissued Date of Patent: Sep. 22, 1998

[54] FILTER CARTRIDGE FOR SWIMMING POOLS AND SPAS

[75] Inventor: Paul J. Meissner, Camarillo, Calif.

[73] Assignee: Meissner Manufacturing Co., Inc., Chatsworth, Calif.

[21] Appl. No.: 868,536

[22] Filed: Apr. 14, 1992

Related U.S. Patent Documents

Reissue of:

[64] Patent No.: 4,921,600
Issued: May 1, 1990
Appl. No.: 210,197
Filed: Jun. 20, 1988

U.S. Applications:

[63] Continuation of Ser. No. 839,647, Mar. 12, 1986, abandoned.

[51] Int. Cl.[6] ..... B01D 35/02

[52] U.S. Cl. ..... 210/169; 210/232; 210/441; 210/455; 210/457; 210/470; 210/493.1; 4/490

[58] Field of Search ..... 210/169, 232, 210/237, 238, 416.2, 441, 437, 457, 459, 493.1, 493.2, 490, 493.5, 455, 497.01, 470, 497.2

[56] References Cited

U.S. PATENT DOCUMENTS

| | | | |
|---|---|---|---|
| 2,218,339 | 10/1940 | Manning | 210/493.2 |
| 3,392,843 | 7/1968 | Munley | 210/493.1 |
| 3,506,475 | 4/1970 | MacDonnell | 210/493.1 |
| 3,520,417 | 7/1970 | Durr et al. | 210/493.1 |
| 3,867,294 | 2/1975 | Pall et al. | 210/493.2 |
| 4,552,658 | 11/1985 | Adock et al. | 210/169 |
| 4,559,138 | 12/1985 | Harons, II | 210/316 |

FOREIGN PATENT DOCUMENTS

| | | | |
|---|---|---|---|
| 680211 | 10/1952 | United Kingdom | 210/493.2 |

OTHER PUBLICATIONS

Replacement Swimming Pool and Spa Filter Cartridge Catalog, 13th Edition.

Star Clear II Brochure, Haywood Pool Products, 19B–83.

*Primary Examiner*—W. L. Walker
*Attorney, Agent, or Firm*—Wagner, Middlebrook & Kimbell

[57] ABSTRACT

A filter cartridge is disclosed having a pleated filter element, hollow perforated core, a lower annular end cap sealed to the bottom ends of the core and filter element and an upper circular end cap sealed to the top ends of the filter element and core. A hollow threaded nipple open at both ends extends coaxially downwardly from the annular end cap, the hollow interior of the nipple being continuous with the hollow interior of the core. A handle extends upwardly from the circular end cap.

8 Claims, 3 Drawing Sheets

FILTER CARTRIDGE FOR SWIMMING POOLS AND SPAS

Matter enclosed in heavy brackets [ ] appears in the original patent but forms no part of this reissue specification; matter printed in italics indicates the additions made by reissue.

CROSS-REFERENCE TO RELATED APPLICATIONS

[This is a continuation of application Ser. No. 06/839,647, filed Mar. 12, 1986, now abandoned.]

*This application is a reissue of Ser. No. 07/210,197, filed Jun. 20, 1988, U.S. Pat. No. 4,921,600, which is a continuation of Ser. No. 06/839,647, filed Mar. 12, 1986, now abandoned.*

FIELD OF THE INVENTION

This invention elates to the construction of a filter cartridge for use in a swimming pole and spa filtration system.

BACKGROUND OF THE INVENTION

Filtration systems are required for swimming pools, spas and the like to remove solid particles from the water and keep the water clean. In one type of filtration system, a filter cartridge is mounted in a reservoir or recess in the wall of the pool or spa. Water enters the recess from the pool or spa and passes through the filtering element of the filter cartridge and is dumped through an outlet opening in the recess back into the pool.

Conventional filter cartridges used in such systems generally have a cylindrical filter element comprising one or more layers or sheets of a porous material, the pore size of the material determining the minimum size of the solid particles which the filter element will remove. The filter element is typically pleated or corrugated to increase the filtering surface area of the material, and hence, to increase the rate at which fluid can pass through the filter element.

The filter cartridge also comprises a generally rigid, perforated, cylindrical core which extends the length of the cartridge and lines the interior of the filter element. The filter element and core are sealed at their ends to generally rigid annular end caps. The end caps and core gave structural integrity to the cartridge.

In one typical arrangement, a perforated pipe which is fitted in the outlet opening and extends upwardly into the recess. The filter cartridge is mounted in the recess in such a manner that the pipe extends through the core of the filter cartridge. A nut is mounted on the end of the pipe which protrudes from the top of the filter cartridge and holds the filter cartridge in place.

In another typical arrangement, a small section of pipe is fitted into the outlet opening so that it protrudes a short distance upwardly into the recess. The diameter of the pipe is about the same as the inner diameter of the lower end cap. The filter cartridge is fitted onto the pipe, with the pipe extending through the end cap and into the core. The filter cartridge is held in place by the snug fit between the pipe and lower end cap. In such an arrangement, the upper end cap is either a solid disk, i.e., no opening, or if an annular disk is used, the opening is plugged.

SUMMARY OF THE INVENTION

The present invention provides a filtration system and filter cartridge particularly suitable for use in pools and spas.

The filtration system comprises a chamber forming means for receiving a filter cartridge a recess in the wall or floor of a swimming pool or spa or a separate housing having a hollow interior. The chamber forming means comprises an inlet opening through which the liquid to be filtered, eg., water, enters the chamber and an outlet opening through the liquid exits the chamber. The outlet opening is defined by a cylindrical outlet port. The portion of the outlet port adjacent the chamber is threaded forming a female coupling for receiving a threaded male coupling or threaded nipple of a filter cartridge. The nipple is made from a softer material than the outlet port.

The filter cartridge comprises a generally cylindrical filter element, a rigid perforated core, an upper end cap, a lower end cap, a hollow threaded nipple extending axially downwardly from the lower end cap and preferably a handle extending upwardly from the upper end cap.

The filter element is formed by one or more layers or sheets of a porous filter media. The filter element is preferably corrugated or pleated to provide a large surface area for rapid filtration. The core is a generally rigid, cylindrical tube which is disposed in and lines the interior of the filter element. The core comprises a plurality of openings to allow the water or other liquid which is being filtered to pass freely through the core.

The lower end cap is a generally annular disk having an outer diameter at least as great as the outer diameter of the filter element. The upper end cap is a solid, generally circular disk having a diameter about equal to the outer diameter of the lower end cap. The end caps are fixedly attached to and form leak-proof seals with the ends of the filter element and core.

The threaded nipple which extends axially downwardly from the lower end cap is preferably integral with the lower end cap. Alternatively, the nipple may be an integral unit with the core. In such an embodiment, the core extends through the lower end cap. As yet another alternative, the nipple may be a separate element which is fixedly attached to the lower end cap. The threaded nipple may be screwed into the outlet port of the chamber forming means to hold the filter cartridge securely in the chamber.

Likewise, the handle is preferably an integral unit with the upper end cap but may be a separate element which is attachable to the upper end cap.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

In accordance with the present invention, there is provided an improved filtration system and filter cartridge particularly suitable for use in swimming pool and spas.

Figure 1:
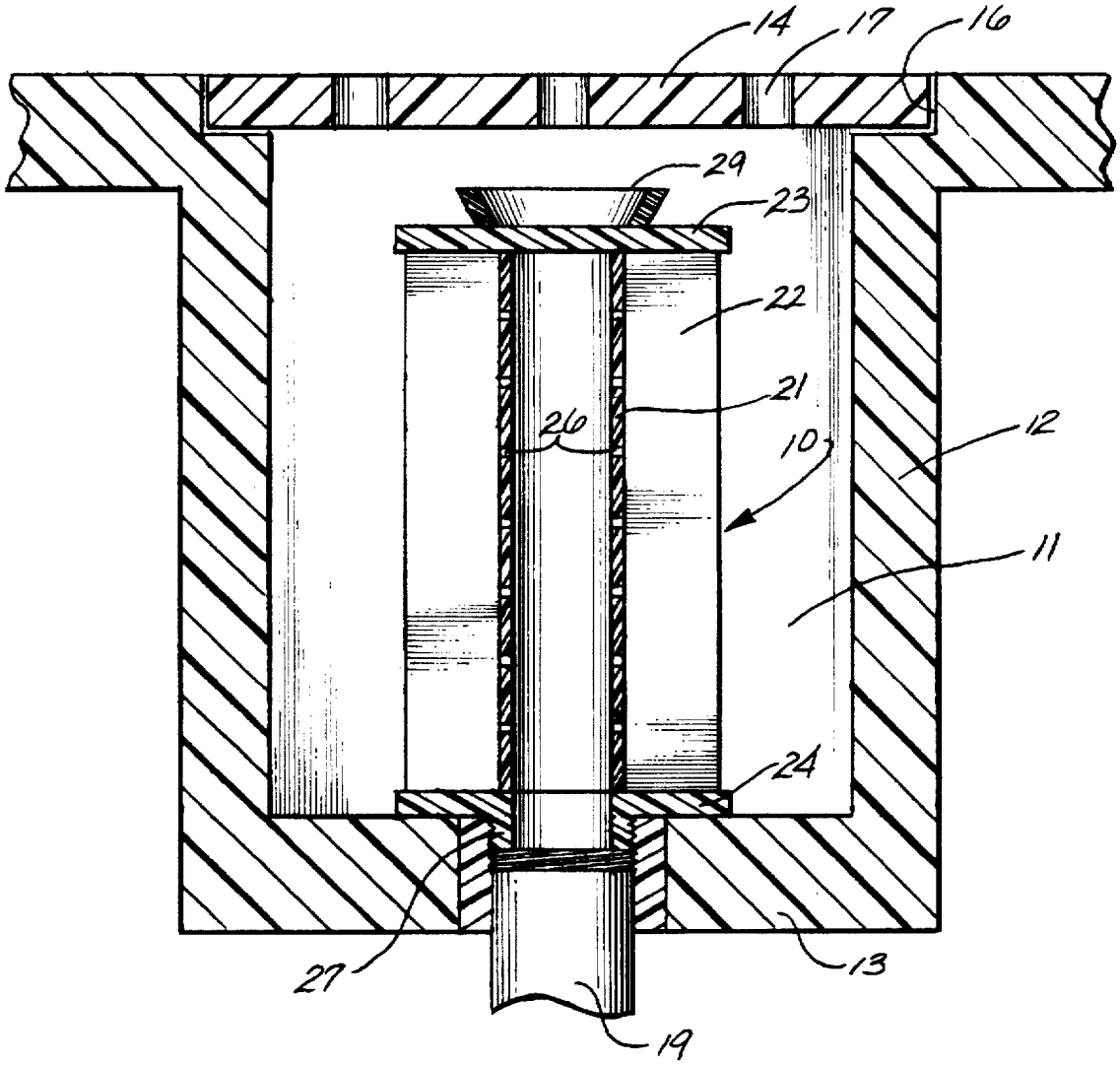
FIG. 1 is a cross-sectional view of a preferred filter cartridge mounted in a filtration recess of a pool or spa.
Figure 2:
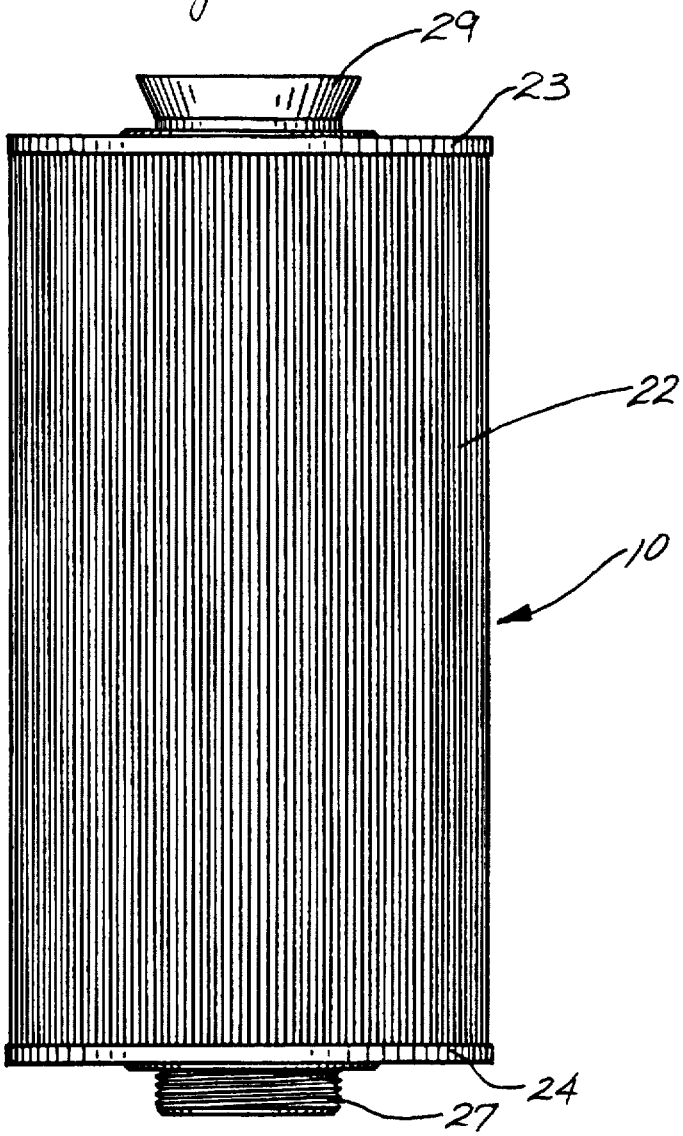
FIG. 2 is a side view of the preferred filter cartridge shown in FIG. 1.

With reference to FIGS. 1 and 2, the filtering system comprises a filtration recess 11 in the floor or wall 12 of the pool or spa. In the exemplary embodiment shown, the recess 11 is generally cylindrical and has a generally flat floor 13. The recess 11 is covered by a perforated cover 14 which sits in an annular notch 16 at the top of the recess 11. Water from the pool or spa 12 flows into the recess 11 through the perforations 17 in the cover 14.

The recess 11 has an outlet port 19 which extends axially through the floor 13 of the recess 11. The portion of the outlet port 19 adjacent the recess 11 is threaded forming a female coupling 20. Water in the recess is pumped through the outlet port and back into the pool or spa.

A filter cartridge 10 constructed in accordance with the present invention is mounted in the recess 1 and comprises a core 21, a filter element 22, an upper end cap 23 and a lower end cap 24.

The filter element 22 comprises one or more layers or sheets of a porous filter media. The pore size of the media determines the minimum particles size of the solids which are removed from the liquid. The filter element 22 is preferably pleated or corrugated as shown to increase the surface area of the filter media. Such a pleated filter element 22 is formed in the shape of a cylinder, the inner edges of the pleats defining the cylindrical interior of the filter element and the outer edges of the pleats defining the cylindrical exterior.

The porous filter media can be made of any suitable material which is chemically resistant to the liquid to be filtered. Preferred materials include paper, polyester, polypropylene, nylon as well as mixtures or blends thereof.

The core 21 is generally cylindrical, having an outer diameter about the same as the inner diameter of the filter element 22. It extends through and lines the interior of the filter element 22. The core 21 has a plurality of holes or perforations 26 which allow liquid passing through the filter element 22 to pass freely into the interior of the core 21 and out of the filter housing 11. The core 21 can be made of any suitable, generally rigid material which, like the material of the filter element, is resistant to the liquid to be filtered. Preferred materials include plastics such a polyvinyl chloride, polypropylene, polyester and nylon. Non-reactive metals may also be used, if desired.

The core 21 and filter element 22 are aligned so than the ends of the filter element 22 and core 21 are generally in a single plane. The filter element 22 and core 21 are held rigidly in this alignment by the end caps 23 and 24.

The lower end cap 24 is a generally flat annular disk having an outer diameter slightly greater than the outer diameter of the filter element and an inner diameter slightly less than the inner diameter of the core 21.

The upper end cap 23 is a solid, generally circular disk 28 having an outer diameter about equal to the outer diameter of the lower end cap 24.

The end caps 24 are sealed to the ends of the filter element 22 and core 21 by conventional means. A preferred means involves a potting method where in a curable liquid resin is poured into an end cap mold and the ends of the core and filter element are immersed into the liquid resin. The resin is then allowed to cure which results in a solid end cap with the ends of the filter element and core embedded in it. The application of heat or some other method may be used to speed up the curing process.

Other sealing means suitable for the present invention include the application of the adhesive or sealing composition to the contacting surfaces, i.e., the ends of the filter element 22 and core 21 and the inside face of the end caps 23 and 24. Such an adhesive or sealing composition can be in the form of a liquid when applied, which dries or cures to form a rigid seal between the contacting surfaces. Alternatively, a solid sealing material having a lower melting point than the material of the filter element 22, core 21, and end caps 23 and 24 may also be used. Such a sealing material is typically heated sufficiently to melt and then applied to the contacting surface in liquid form. The contacting surfaces are brought into contact while the sealing material is still in a liquid state or has been reheated to again reach the liquid state. The sealing material is then allowed to cool and solidify, thereby forming the seal.

Another means for sealing the end caps 24 to the ends of the core 21, guard 23 and filter element 22 is described in U.S. Pat. No. 3,457,339 to Pall et al., which is incorporated herein by reference. In accordance with this method, the inside face of the end caps 24 are heated sufficiently to melt the inside face to a select depth. The ends of the filter element 22 and guard 23 and the shoulder 28 of the core 21 are then imbedded into the melted inside face of the end cap 24 which is then allowed to cool and resolidify, thereby forming the seal.

A hollow threaded cylindrical nipple 27 integral with the end cap 24, i.e. in a one piece construction with end cap 24, extends downwardly from the end cap 24 and is coaxial with the end cap 24 and filter element 22. The nipple 27 is open at both ends and the interior of the nipple 27 is continuous with the interior of the core 21. The diameter of the nipple 27 is selected so that it may be threaded into the outlet port 19. The inner diameter of the nipple 27 is generally the same as the inner diameter of the end cap 24 and is continuous therewith.

A handle 29 is integral with and extends upwardly from the top surface of the upper end cap 23 sufficiently to enable a person to rotate the filter cartridge for screwing the nipple into the female coupling by means of the handle.

Like the other components of the cartridge the end caps 23 and 24 as well as the nipple 27 and handle 29 can be made of any suitale material that is resistant to the liquid being filtered. It is preferred that the nipple be made of a material softer than the material of the outlet port. This is to assure that the female threads of the outlet port are not stripped by improper installation of the filter cartridge, as the outlet port is usually more difficult to replace.

The present invention provides a filtration system which is simpler, less expensive and more versatile than previous systems. It is less expensive and simpler because there are fewer parts to install. It is more versatile because filter cartridges of varying diameters may be readily interchanged and the orientation of the recess, outlet port and thus filter cartridge may be varied as desired without a loss of retention of the filter cartridge in the recess and without making installation more difficult.

The preceding description has been presented with reference to the presently preferred embodiments of the invention shown in FIGS. 1–4. Workers skilled in the art and technology to which this invention pertains will appreciate that alterations and changes in the described structures can be practiced without meaningfully departing from the principles, spirit and scope of this invention.

Figure 3:
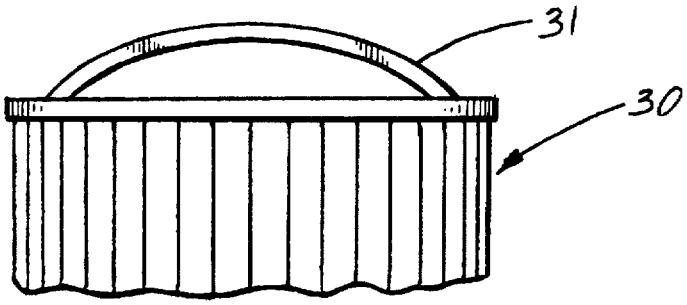
FIG. 3 is a fragmentary side view of a filter cartridge showing an alternative handle design.

For example, in the exemplary embodiment shown in FIGS. 1 and 2, the handle 29 is in the shape of an inverted truncated cone. However, other shapes may be used if desired. FIG. 3 shows a filter cartridge 30 having a raised semicircular handle 31.

Figure 4:
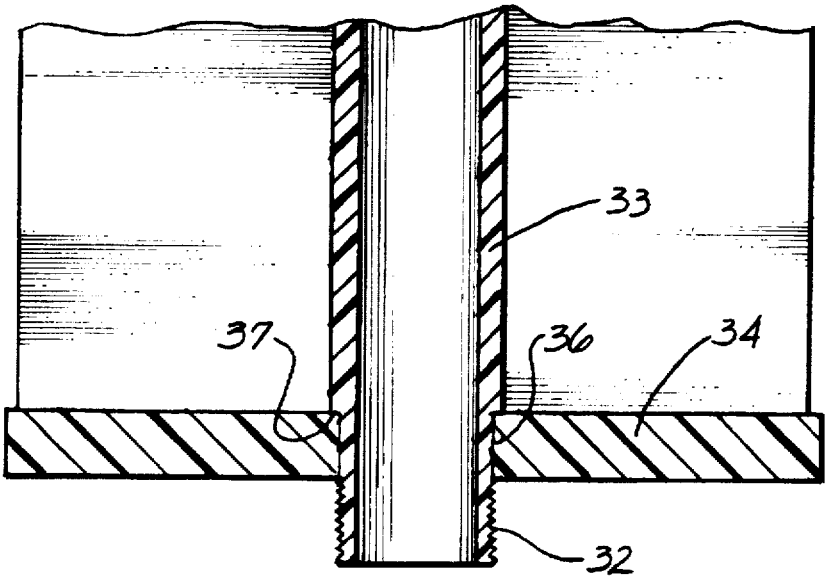
FIG. 4 is a fragmentary cross-sectional view of another preferred filter cartridge.

With reference to FIG. 4, the threaded nipple 32 may be integral with the core 33, i.e. in a one piece construction with core 33, rather than the lower end cap 34. In such an embodiment, the core 33 preferably comprises circumferential notch 36 and shoulder 37 at its lower end. The lower end cap 34 can then be mounted on the core 33 in surrounding relation to the circumferential notch 36 and in abutment with the shoulder 37. Also, in such an embodiment, the outer diameter of the nipple 32 must be no more than the outer diameter of the circumferential notch 36.

Figure 5:
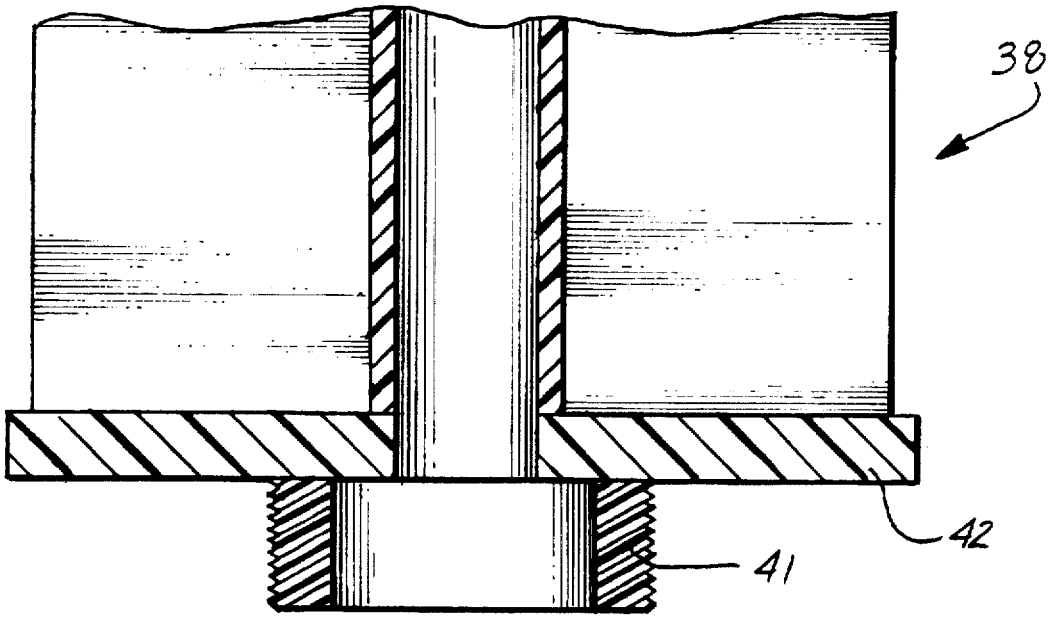
FIG. 5 is a fragmentary cross-sectional view of yet another preferred filter cartridge.

Rather than being integral with the lower end cap or core, the nipple may be a separate element. With reference to FIG. 5, there is shown a filter cartridge 38 having a hollow cylindrical threaded nipple 41 which is attached by adhesive or the like to the bottom surface of the lower end cap 42.

It is also apparent that the filter cartridge of the present invention may be used in any filtration system comprising a chamber forming means whether that be a recess in a pool or spa wall as described above or any other suitable housing. The chamber forming means has an inlet port or opening for the liquid to be filtered to enter the chamber and an outlet port through which the liquid can exit the chamber and wherein the outlet port is threaded for receiving the threaded nipple of the filter cartridge.

Accordingly, the foregoing description should not be read as pertaining only to the precise structures described, but rather should be read consistent with and as support for the following claims which are to have their fullest fair scope.

What is claimed is:

1. A filtration assembly comprising means for forming a chamber comprising an inlet opening through which liquid may enter the chamber and an outlet port comprising an outlet opening through which liquid may exit the chamber, said outlet port being threaded;

a filter cartridge mounted in the chamber and comprising a pleated generally cylindrical filter element having top and bottom ends and comprising at least one layer of porous filter media;

a generally rigid, perforated cylindrical plastic core having top and bottom ends extending through the interior of the filter element;

an annular plastic lower end cap having an outer diameter at least as great as the outer diameter of the filter element and an inner diameter no more than the inner diameter of the core sealed to the bottom ends of the filter cartridge and core;

a hollow externally threaded cylindrical plastic nipple, open at both ends, extending downwardly from and coaxially with the lower end cap, the interior of the threaded nipple being continuous with the interior of the core, the nipple being made of a softer material than the outlet port of the chamber;

a circular plastic upper end cap having a diameter at least as great as the outer diameter of the filter element sealed to the top ends of the filter element and core; and a handle extending upwardly from the upper end cap; and wherein the nipple is threaded into the outlet opening.

2. The filter cartridge as claimed in claim 1 wherein the plastic nipple is a one piece construction with the lower end cap.

3. A pool or spa comprising a floor and at least one side wall forming a primary water containing chamber and a recess in one of the floor or side wall forming a filtration chamber, said recess chamber having an inlet opening through which water from the primary water containing chamber can pass and an outlet port comprising a threaded upwardly facing outlet opening through which water may exit the recess, and wherein a filter cartridge is mounted in the recess, said filter cartridge comprising;

a pleated generally cylindrical filter element having top and bottom ends and alongitudinal axis and comprising at least one layer of a porous filter media;

an annular plastic lower end cap having an outer diameter at least as great as the outer diameter of the filter element and an inner diameter into which the bottom end of the filter cartridge is embedded;

a hollow externally threaded cylindrical plastic nipple, open at both ends, extending downwardly from and coaxially with the lower end cap, the nipple being made of a softer material than the outlet port of the recess;

a circular plastic upper end cap having a diameter at least as great as the outer diameter of the filter element into which the top end of the filter element is embedded;

a plastic handle extending upwardly form the upper end cap in a one piece construction therewith; and wherein the nipple of the filter cartridge is threaded into the outlet opening of the recess with the longitudinal axis or the filter element oriented vertically.

4. The filter cartridge as claimed in claim 3 wherein the plastic nipple is a one piece construction with the lower end cap.

*5. A filter cartridge for a filtration assembly having means for forming a chamber having an inlet opening through which liquid may enter the chamber and a threaded outlet port comprising an outlet opening through which liquid may exit the chamber, said filter cartridge comprising, a pleated generally cylindrical filter element having top and bottom ends and comprising at least one layer of porous filter media; a generally rigid, perforated cylindrical plastic core having top and bottom ends extending through the interior of the filter element; an annular plastic lower end cap sealed to the bottom ends of the filter element and core, said lower end cap having an outer diameter at least as great as the outer diameter of the filter element and an inner diameter no more than the inner diameter of said core; a hollow externally threaded cylindrical plastic nipple, open at both ends, extending downwardly from and coaxially with the lower end cap, the interior of the threaded nipple being continuous with the interior of the core, said nipple being the portion of the filter cartridge threaded into said outlet port, the nipple being made of a softer material than the outlet port of the chamber into which said nipple is to be threaded; a circular plastic upper end cap sealed to the top ends of the filter element and core, said upper end cap having a diameter at least as great as the outer diameter of the filter element; and a handle extending upwardly from the upper end cap.*

*6. The filter cartridge of claim 5 wherein said plastic nipple is a one piece construction with said lower end cap.*

*7. A filter cartridge for a pool or spa having a floor and at least one side wall forming a primary water containing chamber and a recess in one of the floor or side wall forming a filtration chamber, said filtration chamber having an inlet opening through which water from the primary water containing chamber can pass to enter the filtration chamber and an outlet port comprising a threaded outlet opening through which water may exit the filtration chamber, into which outlet port a portion of the filter cartridge is to be threaded, said filter cartridge comprising, a pleated generally cylindrical filter element having top and bottom ends and an outer diameter and comprising at least one layer of a porous*

*filter media; an annular plastic lower end cap into which said bottom end of said filter element is embedded, said lower end cap having an outer diameter at least as great as the outer diameter of the filter element; a hollow externally threaded cylindrical plastic nipple, open at both ends, extending downwardly from and coaxially with said lower end cap, said nipple being the portion of the filter cartridge threaded into said outlet port, the nipple being made of a softer material than said outlet port of said filtration chamber, into said threaded outlet opening of which said*

*nipple is to be threaded; a circular plastic upper end cap into which the top end of the filter element is embedded, said upper end cap having a diameter at least as great as the outer diameter of said filter element; and a handle formed in a one piece construction with said upper end cap.*

*8. The filter cartridge as claimed in claim 7 wherein the plastic nipple is a one piece construction with the lower end cap.*

* * * * *